Nov. 21, 1967    A. D. JOHNSON    3,353,458
APPARATUS FOR STRIPPING DIE CUT BLANKS
Filed Dec. 4, 1964    7 Sheets-Sheet 5
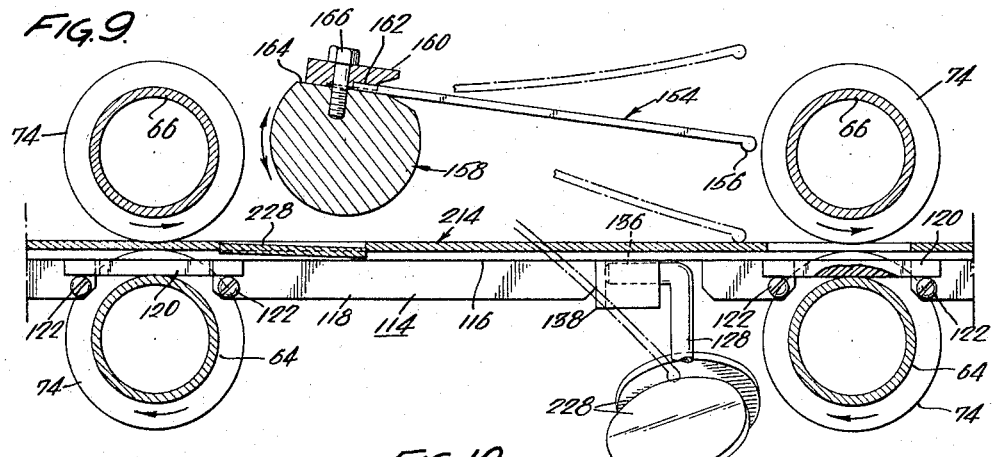
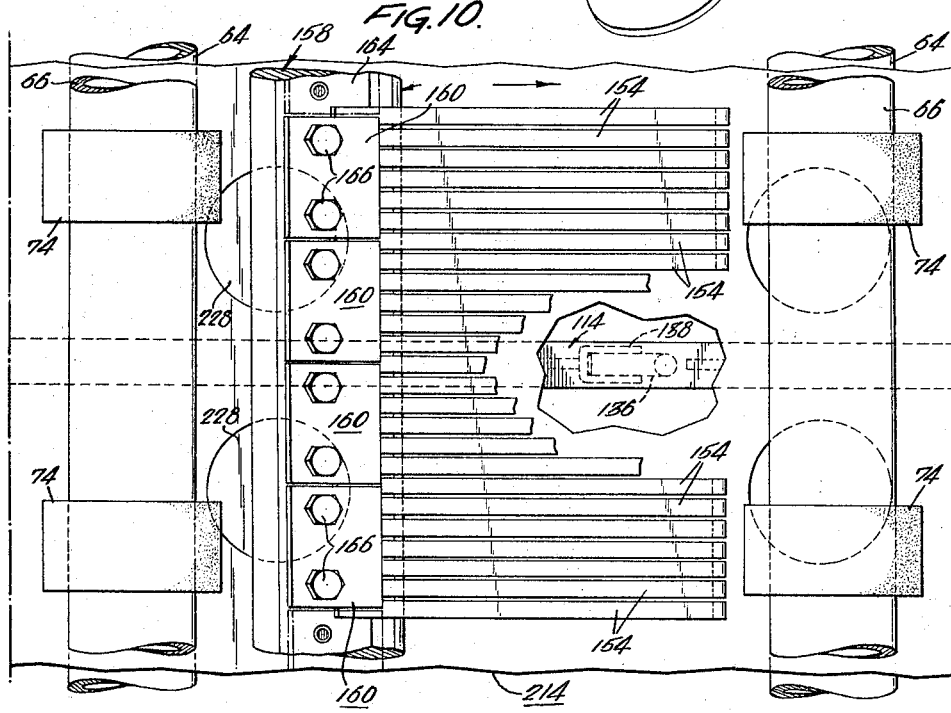
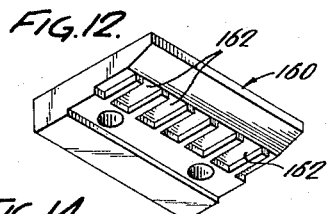
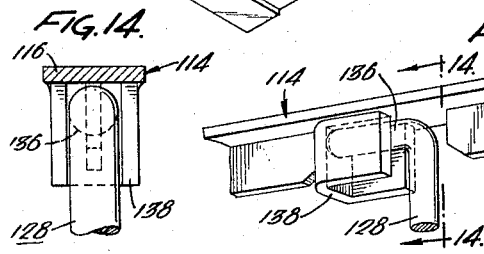
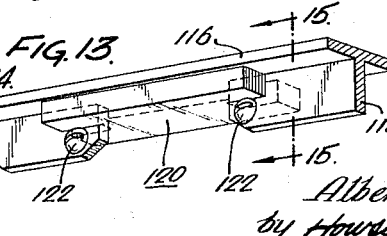
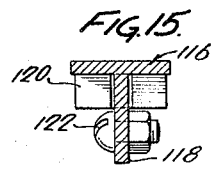
Inventor:
Albert D. Johnson
by Howson & Howson
Attys Nov. 21, 1967 A. D. JOHNSON 3,353,458
APPARATUS FOR STRIPPING DIE CUT BLANKS
Filed Dec. 4, 1964 7 Sheets-Sheet 6
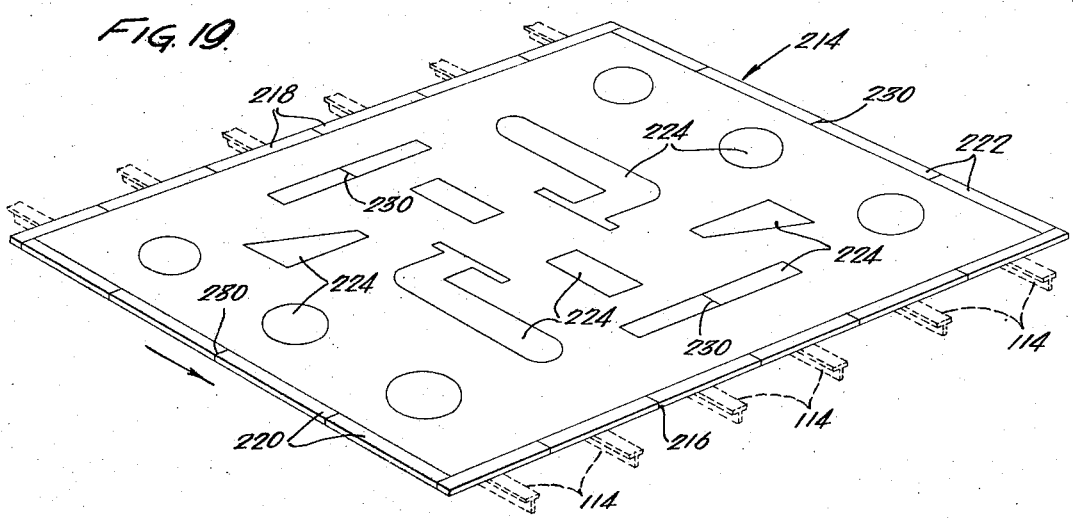
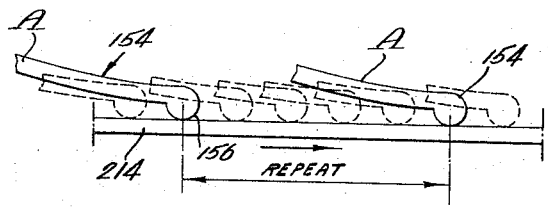
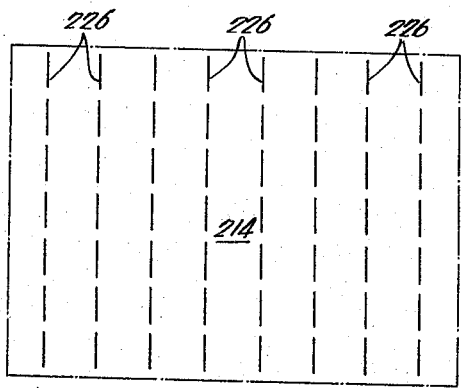
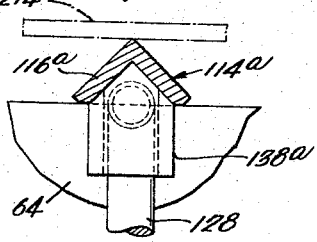
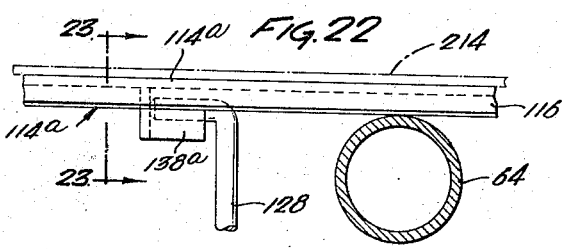
Inventor:
Albert D. Johnson
by Howson & Howson
Attys.

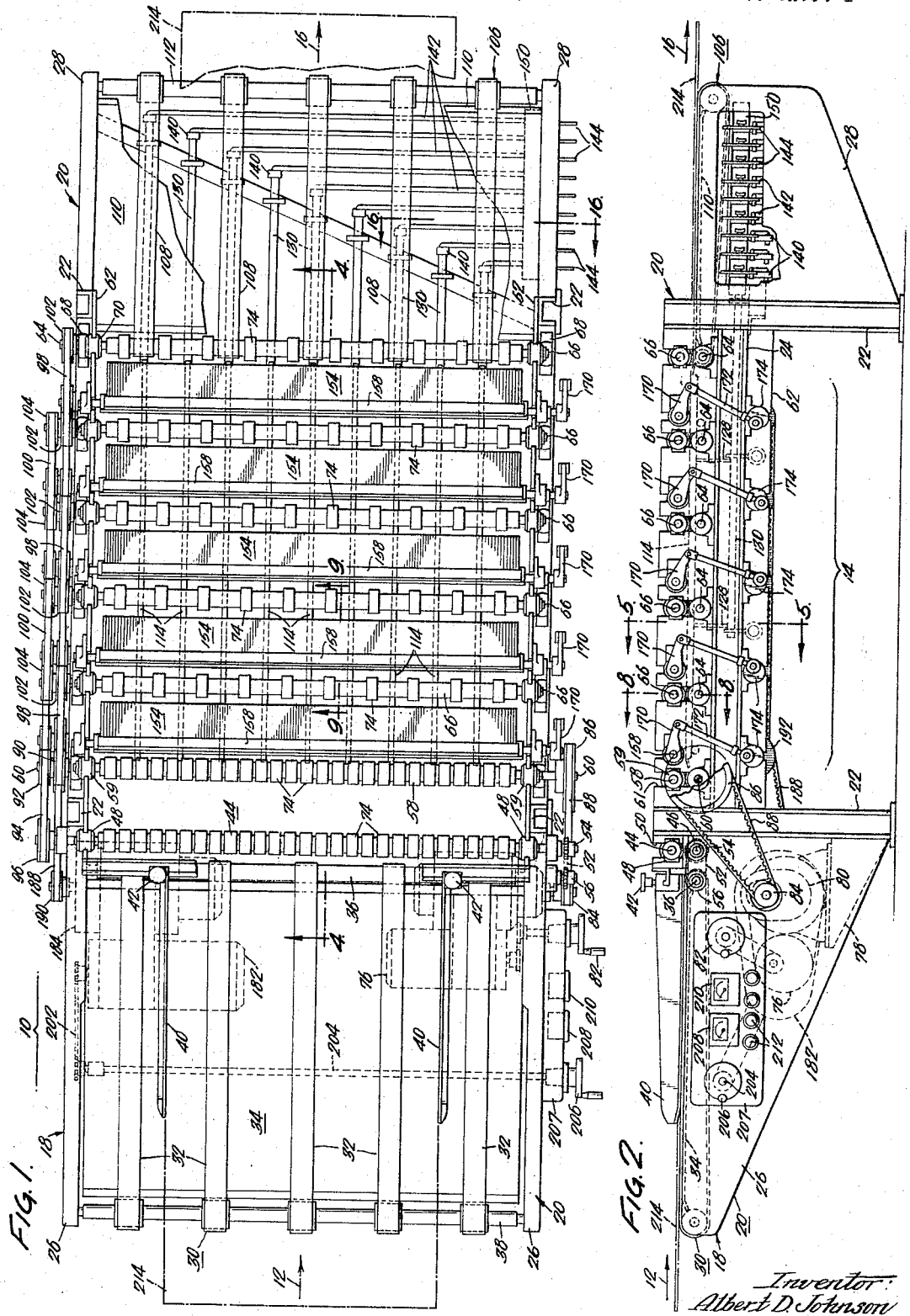

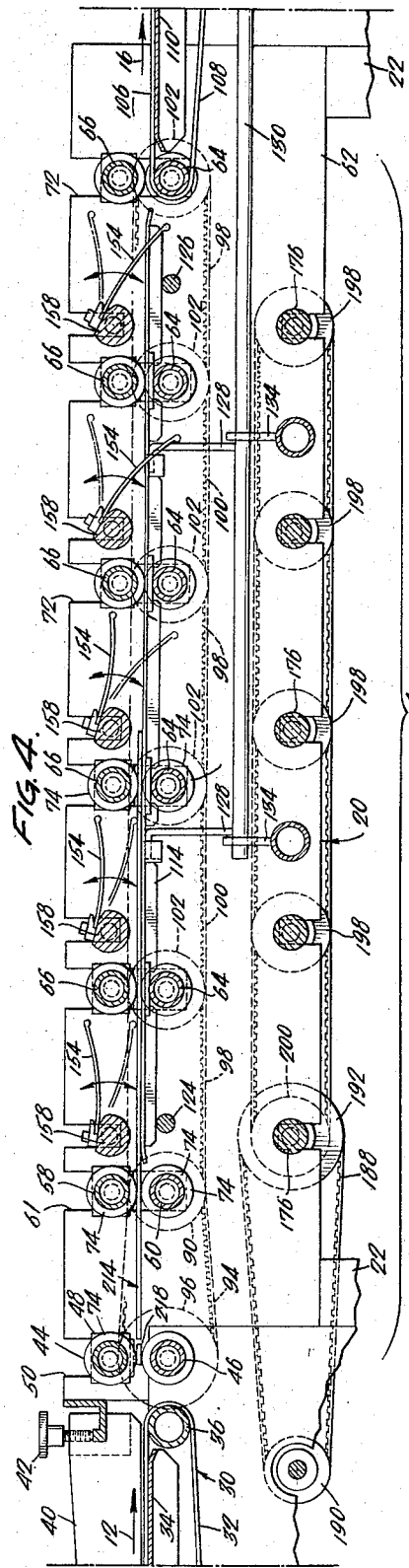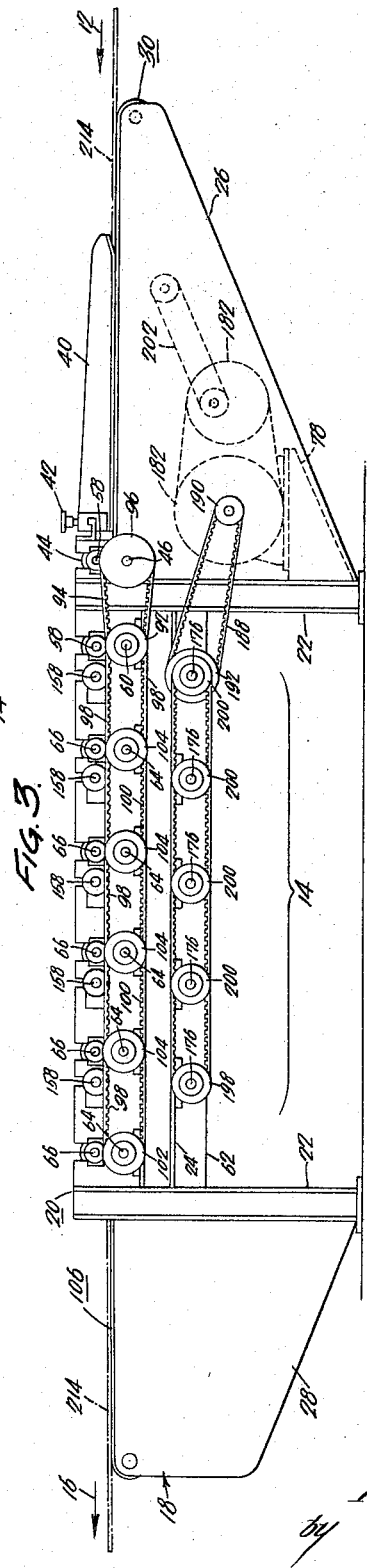

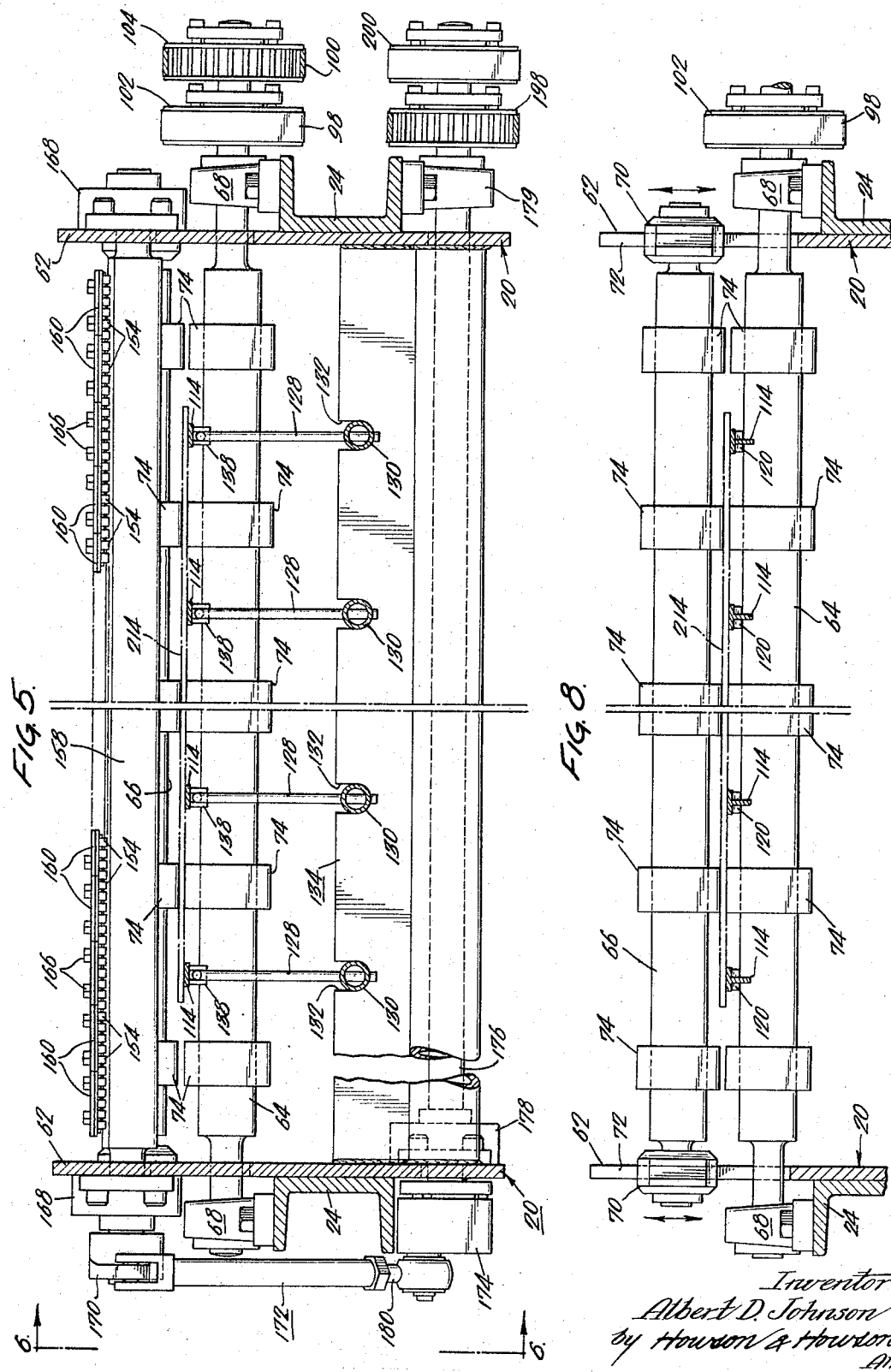

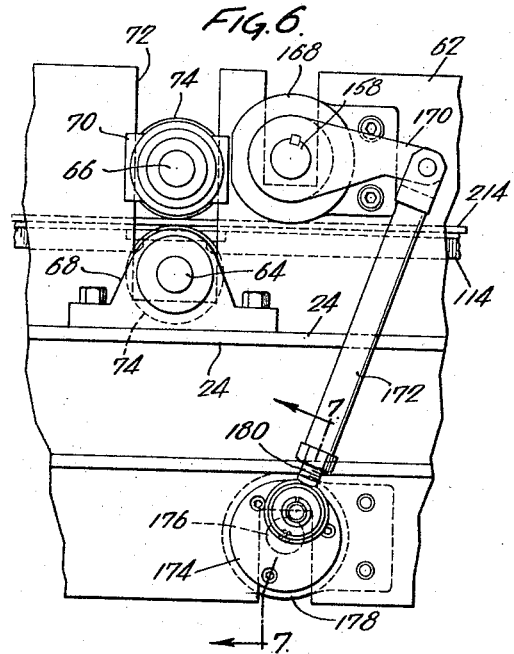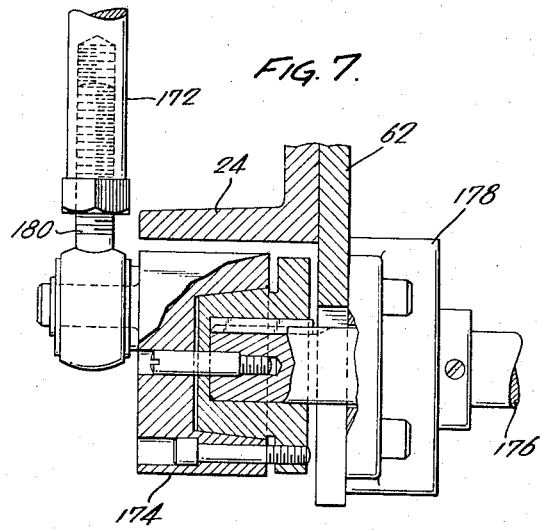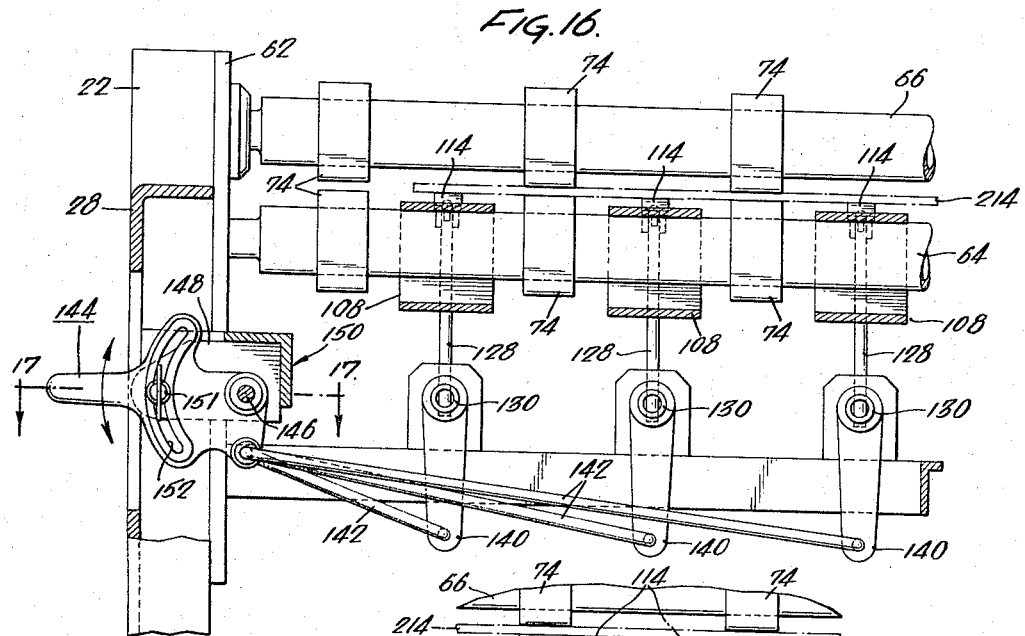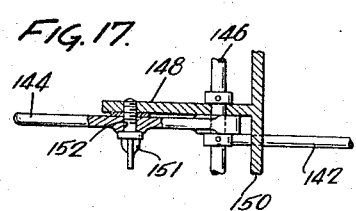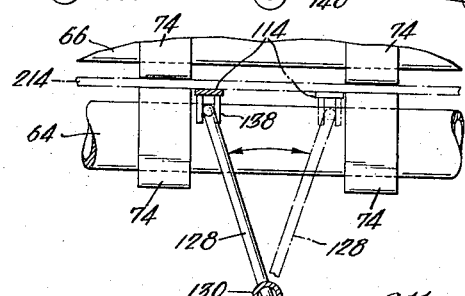

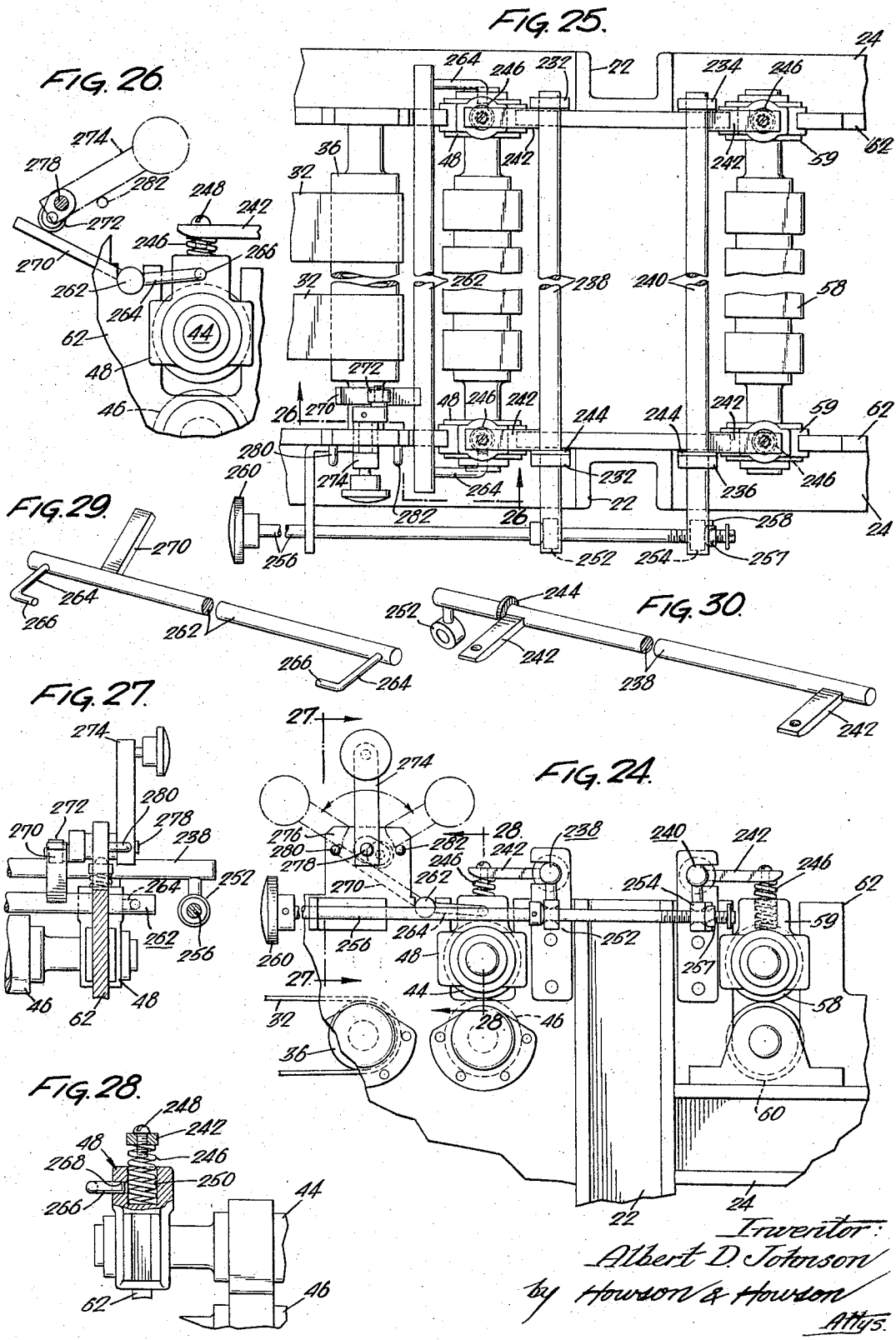

United States Patent Office 3,353,458
Patented Nov. 21, 1967

3,353,458
APPARATUS FOR STRIPPING DIE CUT BLANKS
Albert D. Johnson, 27 Fairview Drive,
St. Davids, Pa. 19087
Filed Dec. 4, 1964, Ser. No. 415,938
21 Claims. (Cl. 93—36)

The present invention relates to a novel apparatus for stripping die cut scrap portions, including salvage edges and internal knockouts, from blanks of paperboard and similar materials.

In the manufacture of corrugated paperboard boxes and similar articles, the blanks from which the articles are formed are die cut in a stamping operation to accurately cut the selvage edges and any interior apertures. A further stripping operation is required, however, to remove the die cut scrap portions because of the retaining effect of an inevitable small number of uncut fibers and the tendency of internal knockouts to remain wedged in the apertures.

In some instances, particularly with runs of limited quantity, this operation has been performed manually. More commonly, the blanks have been subjected to a mechanical punching operation utilizing an array of punch elements which must be specially set up for each blank configuration. The punch elements must be shaped and positioned to correspond with the blank die cuts and means must be provided to accurately register the blanks with respect to the punch elements. The manual operation is time consuming and inefficient, while the punching operation involves the delay and expense of a special set-up for each type of blank in addition to the laborious individual placement and removal of each blank from the punch apparatus.

In view of the above difficulties characteristic of the prior art stripping methods, it is a primary object of the present invention to provide an apparatus for stripping die cut scrap portions from paperboard blanks which provides a fast and efficient stripping of the scrap portions and which can be employed with blanks of any size or shape regardless of the die cut configuration.

Another object of the invention is to provide an apparatus as described characterized by the impingment of a plurality of oscillating reeds at closely spaced intervals over the entire surface of each blank of effect a displacement of the strap portions regardless of their locations on the blanks.

A further object of the invention is to provide an apparatus as described which provides a continuous and automatic stripping action as opposed to a conventional intermittent type operator-actuated operation.

An additional object of the invention is to provide an apparatus as described which is adapted for production line use wherein the blanks are stripped while traveling continuously in a single direction and may be readily handled entirely by automatic handling devices.

A still further object of the invention is to provide an apparatus as described which is readily adaptable for use with blanks having different strength characteristics such that the die cut edges of the blanks are not damaged during the stripping of the scrap material.

Additional objects and advantages of the invention will be more readily apparent from the following detailed description of an embodiment thereof when taken together with the accompanying drawings in which:

FIG. 1 is a plan view of apparatus illustrating a preferred embodiment of the invention;

FIG. 2 is an elevational view showing one side of the apparatus of FIG. 1;

FIG. 3 is an elevational view showing the opposite side of the apparatus of FIG. 1;

FIG. 4 is a partial view partly in section taken along line 4—4 of FIG. 1;

FIG. 5 is a view partly in section taken along line 5—5 of FIG. 2;

FIG. 6 is a fragmentary view taken along line 6—6 of FIG. 5;

FIG. 7 is a sectional view taken along line 7—7 of FIG. 6 showing details of the crankshaft and eccentric connection;

FIG. 8 is a view partly in section taken along line 8—8 of FIG. 2;

FIG. 9 is a view partly in section taken along line 9—9 of FIG. 1 showing in broken lines the manner in which the reeds are oscillated to effect a stripping of the die cut portions;

FIG. 10 is a partial plan view of the structure illustrated in FIG. 9;

FIG. 11 is a perspective view of a typical reed element;

FIG. 12 is a perspective view of a typical reed holding plate;

FIG. 13 is a perspective view of an adjustable runner assembly showing the bearing shoe mounting arrangement and adjuster rod bracket;

FIG. 14 is a view partly in section taken along line 14—14 of FIG. 13;

FIG. 15 is a view partly in section taken along line 15—15 of FIG. 13;

FIG. 16 is a fragmentary view partly in section taken along line 16—16 of FIG. 1;

FIG. 17 is a sectional view taken along line 17—17 of FIG. 16;

FIG. 18 is a fragmentary view showing the manner in which a runner assembly may be adjusted laterally by means of the adjuster rods;

FIG. 19 is a perspective view showing a die cut blank prior to stripping of the selvage edges and interior knockouts and showing the preferred manner of dividing the die cuts to permit a ready displacement of the scrap portions through the adjustable runners, the relative positions of which are indicated in broken lines;

FIGS. 20 and 21 are, respectively, elevational and plan views illustrating the strike pattern of the reeds on the surface of a blank;

FIG. 22 is a fragmentary side elevational view showing a modified form of runner assembly;

FIG. 23 is a fragmentary end elevational view taken along line 23—23 of FIG. 22;

FIG. 24 is a partial side elevational view of a die cut stripper showing the manner in which the upper nip rolls are adjustably spring biased against the lower nip rolls;

FIG. 25 is a partial plan view of the apparatus shown in FIG. 24;

FIG. 26 is a partial elevational view showing the manner in which the upper infeed nip roll may be disengaged from the lower infeed nip roll;

FIG. 27 is a partial view taken along line 27—27 of FIG. 24;

FIG. 28 is a partial view partly in section taken along line 28—28 of FIG. 24;

FIG. 29 is a perspective view of the upper infeed nip roll lifter bar; and

FIG. 30 is a perspective view of one of the upper nip roll pressure bars.

The method of the present invention comprises essentially the subjecting of the die cut blank to a plurality of closely spaced reed elements which are oscillating at a high frequency, the blank being advanced relative to the oscillating reed elements such that the entire surface of the blank is subjected to the percussive effect of the reed elements with only slight spacing between the successive points of contact of the blank surface by the elements. By controlling the speed of travel of the blank relative to the reed elements as well as the frequency of oscillation and the amplitude of oscillation of the reed elements, the stripping action can be controlled to maximize the stripping efficiency and prevent damage to the die cut edges of the blank.

Referring to the drawings and specifically FIG. 3 thereof, the illustrated embodiment of the invention comprises a die cut stripper 10 consisting essentially of an infeed end 12 which serves to feed blanks horizontally into the central stripping region 14 from which the stripped blanks pass onto the discharge end 16. The stripper includes a main frame assembly 18 which includes opposed side frames 20 each consisting of vertical channel elements 22 supporting a horizontal channel 24. Extending from the main frame assembly 18 at the infeed end 12 of the unit is the infeed conveyor frame 26. At the discharge end 16 a discharge conveyor frame 28 extends from the main frame assembly.

Referring to FIGS. 1 and 2, an infeed conveyor 30 on the infeed conveyor frame 26 is comprised of tape belts 32 driven across the dead plate 34 by the tape belt drive shaft 36 in cooperation with the tape belt idler shaft 38. Side guides 40 are positioned above the infeed conveyor 30 by means of the adjustable positioning means 42.

Mounted adjacent and aligned with the inner end of the infeed conveyor 30 are upper and lower infeed nip rolls 44 and 36, the upper roll 44 in contact with and being frictionally driven by the lower roll 46. The lower roll is fixedly journaled between the side members of the infeed conveyor frame 26, while the bearings 48 of the upper roll are vertically slidable in the slots 50 of the frame side members. The upper nip roll 44 is adjustably spring-biased against the lower nip roll 46 by a mechanism which is described in further detail below and is shown in FIGS. 24–30. The infeed conveyor tape belt drive shaft 36 is driven from the lower nip roll 46 by means of a roller chain 52 engaging the respective equally sized sprockets 54 and 56 whereby the infeed conveyor is driven at the same speed as the nip roll 46.

Spaced from the nip rolls 44 and 46 in the central stripping region of the apparatus are additional upper and lower nip rolls 58 and 60 which are mounted between plates 62 secured interiorly of the channels 24 as shown in FIG. 8. The upper nip roll 58 is vertically slidable in the same manner as the upper nip roll 44, being journaled in pillow blocks 59 which are slidable within the slots 61 of the plate 62. The upper nip roll 58 is also adjustably spring-biased against the lower nip roll 60 by a mechanism described in detail below which equalizes the spring force applied to the two sets of nip rolls.

Also journaled between the plates 62 in spaced aligned relation are the five feed rolls 64, each having a corresponding idler roll 66 journaled thereabove. As shown in detail in FIG. 8, the feed rolls 64 as well as the lower nip roll 60 are journaled in pillow blocks 68 bolted to the upper flanges of the channels 24. The idler rolls 66 are journaled in bearings 70 which, as indicated, are vertically slidable within the slots 72 in the plates 62. The weight of the idler rolls is sufficient to maintain a frictional driving thereof by contact with either the supporting driven rolls or with a blank passing therebeneath. These upper rolls are thus vertically displaceable to automatically adapt to various blank thicknesses while maintaining a constant gripping force on the blanks. The nip rolls 44, 46 and 58, 60 are characterized by a large number of closely spaced rubber drive elements 74 while the feed rolls 64 and idler rolls 66 have substantially fewer such drive elements for a purpose set forth herebelow.

As shown in FIG. 1, the various nip rolls and feed rolls are driven by a motor 76 supported on motor platform 78 within the infeed conveyor frame 26. The motor 76 is coupled with a Reeves drive 80, the output speed of which is varied by means of speed control crank 82. The Reeves drive is connected with the nip roll 60 by means of the respective timing gears 84 and 86 and the timing belt 88. As shown most clearly in FIG. 1, the shaft ends of nip roll 60 extend well beyond the plates 62, one shaft end bearing the timing gear 86 and the other bearing an inner timing gear 90 and an outer timing gear 92. As shown in FIG. 3, the outer timing gear 92 is connected by timing belt 94 with timing gear 96 on nip roll 46 for driving the infeed nip rolls 44 and 46. The timing gear 96 is somewhat larger than the timing gear 92 so that the infeed rolls 44 and 46 are driven at a slower speed than the nip rolls 58 and 60. The feed rolls 64 are driven at the same speed as the nip roll 60 from the timing gear 90 on the nip roll 60 by a succession of inner and outer timing belts 98 and 100 coacting with respective inner and outer timing gears 102 and 104 of the feed rolls 64.

A discharge conveyor 106 similar to the infeed conveyor 30 is supported by the discharge conveyor frame 28 and includes tape belts 108 supported by dead plate 110. The tape belts are driven by the endmost feed roll 64 in cooperation with the idler shaft 112 at the outer edge of the dead plate.

From the above description of the apparatus, it can be understood that blanks are fed by the infeed conveyor through the nip rolls 44, 46 and 58, 60 into the central stripping region 14 wherein a stripping operation is effected as described below. The blanks are fed through the stripping region by the several feed rolls and idler rolls 64 and 66 and are discharged therefrom onto the discharge conveyor 106.

In order to support the blanks in the central stripping region, adjustable runner assemblies 114 are provided in spaced relationship throughout the stripping region, the runner assemblies extending in the direction of travel of the blanks. As shown most distinctly in the detail views of FIGS. 9 and 13, the runner assemblies comprise metal runner elements 116 of T-section, with the flat upper surface of the T serving as a support surface for the paperboard blanks. The downwardly depending portion 118 of the runner element is cut away in the region of the feed rolls 64 such that each runner element may be supported by the respective feed roll shafts, resting thereon upon nyon bearing shoes 120. The bearing shoes are notched as shown in FIGS. 13 and 15 so as to be held transversely and axially in position and are vertically secured by bolts 122. As shown in FIG. 4, the runner assemblies extend between the lower nip roll 60 and the endmost feed roll 64 and are supported in the regions adjacent these rolls by runner support rods 124 and 126 extending between the plates 62.

The runner assemblies may be adjustably positioned as desired between the spaced drive elements 74 of the feed rolls 64 to most conveniently permit ejection of the scrap portions of the blank therebetween. The adjustment of each runner assembly is effected by means of runner adjustment rods 128 which extend upwardly in parallel relation from a tubular adjustment rod shaft 130. As shown in FIG. 5, there is an adjuster rod shaft 130 extending beneath and parallel with each runner assembly and journaled in slots 132 of bearing plates 134. The upper ends 136 of the adjuster rods are horizontally directed against the direction of flow of the blanks and engage U-shaped adjuster rod brackets 138 secured beneath the runner elements to permit transverse adjustment of the elements while preventing longitudinal movement of the elements in the direction of blank travel.

The adjuster rod shafts 130 are rotated to change the transverse position of the individual runner assemblies by means of the crank arms 140, connecting rods 142 and control quadrants 144 as shown in FIG. 16. As shown in FIGS. 2, 16 and 17, the several control quadrants 144 are pivotally mounted on a quadrant shaft 146 supported by quadrant arms 148 which are secured to a bracket 150 on the discharge conveyor frame 28. As shown in FIG. 16, the central position of each quadrant provides a central position of the corresponding runner assembly between adjoining drive elements 74 of the feed rolls 64. Adjustment of the quadrants permits individual positioning of the runner assemblies at any desired position between the drive elements 74 as illustrated in FIG. 18 which shows the two extreme positions between which a runner assembly may be set. Each runner assembly is locked in the desired transverse position by means of a locking screw 151 in the quadrant arm 148 coacting with the quadrant slot 152.

The above described elements of the apparatus relate to means for supporting and advancing die cut blanks through the central stripping region 14 of the apparatus. The elements effecting removal of the scrap portions comprise a plurality of closely spaced parallel reed elements 154 such as shown in FIGS. 10 and 11, a set of which are supported in extending relation immediately in front of each idler roll 66. The reed elements 154, which are preferably made of nylon, are characterized by an essentially cylindrical outer tip portion 156. The reed elements are secured to transversely extending reed shafts 158 by means of reed holding plates 160 which, as shown in detail in FIG. 12, are characterized by slots 162 for securing the reed elements in parallel alignment upon mounting against the flat portions 164 of the reed shafts 158 by means of bolts 166. The reed shafts 158, as shown in FIG. 5, are journaled in bearings 168 mounted on the plates 62. The reed shafts extend on one side of the unit beyond the bearings 168, to which extending portions are keyed crank arms 170 pivotally connected on their outer end to connecting rods 172. The connecting rods 172 are attached to eccentrics 174 mounted on crank shafts 176 which are supported on one side by bearings 178 on plate 62 and on the other by pillow blocks 179 secured to channel 24. The effective length of the connecting rod 172 may be adjusted upon removal thereof from the eccentric by means of the threaded neck portion 180 cooperatively engaging the lower end of the connecting rod. The amplitude of oscillation of the reed elements is initially established by means of this adjustment.

The crank shafts 176, as shown most clearly in FIGS. 1, 3 and 4, are driven in rotation by motor 182 and the Reeves drive 184 supported on platform 78 beneath the infeed conveyor 30. Timing belt 188 passing over the timing gears 190 and 192, respectively, connects the Reeves drive with the foremost crankshaft 176. The successive crankshafts are driven from the foremost crankshaft by the inner and outer timing gears 198 and 200 on the successive crankshaft ends.

As shown in FIG. 2, the eccentrics 174 are positioned on the crankshafts 176 at equal rotational intervals such that the successive sets of reeds will be actuated in successive relation. In the illustrated unit having five sets of reeds, the eccentrics are rotationally spaced at 72° intervals.

The Reeves drive 184 is controlled by means of the speed control belt 202 and speed control rod 204 by the speed control crank 206. A control panel 207 is provided with tachometers 208 and 210 which respectively indicate the speed of the crankshafts and the feed drive rolls. The instrument panel also includes the usual motor control buttons 212.

For operation of the unit, the motor 76 and 182 are started and the speed of the feed rolls and the crankshafts adjusted by means of the speed control cranks 82 and 206. Die cut cardboard blanks 214 such as that shown in FIG. 19, having front and rear selvage edges 216 and 218, side selvage edges 220 and 222, and interior apertures 224 of various configurations, are introduced into the apparatus on the infeed conveyor 30. The blanks are fed by the conveyor into the nip rolls 44 and 46 and thence pass into nip rolls 58 and 60. As described above, due to the size differential between the timing gears 92 and 96, the nip rolls 44 and 46 and the infeed conveyor 30 are driven at a slower speed than the nip rolls 58 and 60. This arrangement effects a tension force on the blank between the two sets of nip rolls, which force serves to strip the front and rear selvage edges 216 and 218 from the blanks. The front selvage edges 216 are stripped upon engaging the nip rolls 58 and 60, while the rear selvage edges 218 are stripped on passage through the nip rolls 44 and 46. It will be noted that all of the selvage edge strips are die cut so as to break up into short scrap lengths during passage through the apparatus.

The speed differential between the two sets of nip rolls serves to remove only the front and rear selvage edges of the blanks. As the blanks are advanced through the stripping region 14, the upper surfaces of the blanks are subjected to the oscillating reeds 154 which, as shown in FIG. 9, are normally oscillated in such a manner that in unobstructed travel the reed tips 156 extend below the plane of the runner elements 116. The reed elements are sufficiently flexible such that a whipping action is imparted thereto by the rotationally oscillating reed shafts 158. The interruption of the travel of the reed tips by contact with the upper blank surfaces deforms the flexible reeds so as to apply, with each oscillation of the reeds, a downward force of brief duration to the blank surfaces which serves to dislodge the die cut scrap portions.

The reeds are oscillated with a sufficiently high frequency such that a closely spaced strike pattern is effected by the reeds on the surfaces of the blanks such as that shown in FIG. 21. In the example of FIG. 21, the strike pattern is formed by feeding the blanks at 200 feet per minute and by driving the reeds at 600 oscillations per minute. As illustrated in FIG. 20, the five sets of reeds strike the blanks in a successive, spaced manner, this being accomplished by the adjustment of each of the crankshaft eccentrics 174 to the previously described 72° relationship with the preceding eccentric. A given set of reeds "A" repeats its stroke against the blank only after each of the four other sets of reeds has contacted the blank. The close lateral spacing and the high frequency of oscillation of the reeds produces a strike pattern which encompasses the entire surface of each blank.

The successive strike lines 226 of FIG. 21 illustrating the lines of contact of the reeds with a blank are, due to the spaced angular relation of the crankshaft eccentrics, equally spaced along the blank in the direction of blank travel. The spacing of the strike lines may be regulated either by changing the speed at which the blanks are fed through the apparatus or by varying the speed of oscillation of the reeds. Either such control results in a changing of the distance between the strike lines but does not change the equally spaced relationship of the lines.

Any change in the oscillating speed of the reeds, however, provides a change in the force with which the flexible reeds strike the blanks and since this force must necessarily be varied to suit the particular types of blanks fed through the unit, the oscillating speed must be established first, following which the blank feed speed is regulated. For example, with a light weight paperboard blank, a light striking force is indicated and hence a relatively slow oscillating speed of the reeds should be chosen. If the reed strike pattern is then desired to be closely spaced, the feed of the blanks must be relatively slow. Conversely, if a high strength blank is being run, a relatively high oscillating speed would be chosen to provide a higher reed striking force, permitting employment of a high speed blank feed to achieve a relatively closely spaced reed strike pattern.

The reeds, on striking the side selvages and interior apertures of the blanks in the repeated strike pattern illustrated, displace the selvage strips and aperture knockouts by severing the uncut fibers, and the scrap portions drop between the runner elements 116 into a suitable scrap collecting area beneath the machine. The circular knockouts 228, illustrated in FIGS. 9 and 10, are of small size and are spaced between the runner elements so as to fall freely between the runner elements into the scrap collecting region. However, with larger knockout portions and the lengthy selvage strips, it is highly desirable to include additional die cut slits 230, shown in FIG. 19, to facilitate the dropping of the scrap portions through the runner elements.

To further insure that the scrap portions do, in fact, drop between the runner elements rather than continue through the apparatus with the possibility of damaging the blanks, each runner element may be shifted laterally by means of the runner adjustment rods 128, adjuster rod shaft 130, crank arm 140, connector arm 142 and quadrant 144. This positioning arrangement permits each runner element to be individually positioned, as shown in FIG. 18 at any point between the drive elements 74 of the feed rolls 64 so as to avoid blocking the downward movement of the scrap portions. The quadrants 144 are locked in position by means of the locking screw 151 and may be adjusted during operation of the apparatus to change the position of the runner elements.

For a production run involving blanks having the same die cut pattern, the side guides 40 of the infeed conveyor 30 are adjusted by means of the adjuster means 42 so as to position the blanks in the most desirable position with respect to the runner elements. The runner elements are then further adjusted to the optimum setting to permit the free displacement of the scrap portions from the blanks.

FIGS. 22 and 23 show a modified form of runner assembly 114a in which the runner element 116a is formed of angled stock having the apex of the angle upward for contact with the lower surface of the moving blanks. In this arrangement, the angle bears directly against the shafts of the feed rolls 64, eliminating the bearing shoes utilized in the preferred embodiment. The modified form of runner elements are adjustable by means of the adjuster rods 128 and adjuster rod brackets 138a in the same manner as that of the above-described embodiment. The sloping surfaces of the angle runner elements facilitate the stripping of interior knockouts which extend transversely across a runner assembly.

The reed elements as suggested above, are preferably formed of nylon in view of its strength, and its self-lubricating low friction properties. The nylon reeds do not mark the cardboard blanks or deface printing on the blank surfaces.

The method and apparatus may suitably be employed with a great variety of materials and is particularly well adapted for use with either plain or corrugated paperboard blanks.

The upper nip rolls 44 and 58 are adjustably spring-biased against the corresponding lower nip rolls 46 and 60 by means of the apparatus shown in FIGS. 24–30. With particular reference to FIG. 24 and 25, this arrangement be seen to include pressure bar brackets 230, 232, 234 and 236 which extend upwardly from opposing side frame elements of the apparatus between and adjacent the pairs of nip rolls. The brackets are adapted to pivotally support the pressure bars 238 and 240 for which purpose the elements 230 and 234 are bored to receive one end of the respective pressure bars while the elements 232 and 236 are slotted as shown in FIG. 24 to permit ready insertion and removal of the bars. Spring arms 242 which extend perpendicularly near each end of each pressure bar aligned with the bearings 48 of the upper nip roll 44 and the bearings 59 of the upper nip roll 58, prevent axial movement of the pressure bars, washers 244 being secured to the pressure bars adjacent the support elements 232 and 236 to aid in establishing the proper axial positions of the bars.

The outer ends of the spring arms 242 bear downwardly against the compression coil springs 246 which are maintained in position by the bolts 248. The coil springs 246 are seated within sockets 250 in the respective nip roll bearings 48 and 59 whereby the downwardly directed spring forces urge the nip rolls into biased engagement.

The pressure bars 238 and 240 are rotationally controlled to adjust the spring pressure on the nip rolls by means of the collar-tipped crank arms 252 and 254 extending respectively downward from the outer end thereof. An adjusting rod 256 extends through the collars of the crank arms 252 and 254 and is threaded adjacent the crank arm 254 to coact with a nut 257, the rotation of which is prevented by means of lug 258. A collar 259 is secured to the adjusting rod 256 adjacent the crank arm 252 such that rotation of the adjusting arm by means of the knob 260 will, depending upon the direction of rotation, provide either a drawing together or a separation of the crank arms and hence either increase or decrease the spring pressure on the nip rolls. It will be noted that this arrangement automatically equalizes the spring force on the two sets of nip rolls.

In order to permit disengagement of the infeed nip rolls for use of the apparatus with blanks which do not have front and rear selvage edges, a lifter bar 262 is pivotally mounted between the side frame elements of the apparatus and includes lifter arms 264 at each end thereof having fingers 266 which engage holes 268 in the bearings 48 as shown in FIGS. 28 and 29. The lifter bar is pivoted to raise the nip roll 44 against the spring pressure by means of a cam arm 270 against which the roller cam 272 of the lifter control lever 274 is engaged. As shown in FIGS. 26 and 27, the lever 274 is pivotally mounted on a frame extension 276 for rotation about an axis 278, and the angular movement thereof is limited by the stop pins 280 and 282. With the lever against the stop 282 as shown in FIG. 26, the nip roll 44 is lifted out of disengagement with the lower nip roll 46. To reengage the nip rolls, the lever 274 is rotated in a counterclockwise direction, coming to rest against the stop pin 280 as shown in FIG. 24.

The described nip roll spring loading arrangement permits an adjustable, balanced biasing of the spaced nip rolls for operation with various types of blanks and additionally permits the disengagement of one set of nip rolls without affecting the spring bias relation of the other set for the processing of blanks lacking front and rear selvage edges.

Manifestly, changes in details of construction can be effected by those skilled in the art without departing from the spirit and the scope of the invention as defined in and limited solely by the appended claims.

I claim:

1. Apparatus for stripping die cut scrap portions from paperboard blanks comprising a plurality of closely spaced parallel reed elements, means for oscillating said reed elements, and means for progressively advancing the blanks to effect intermittent contact with the reed elements at closely spaced intervals thereon whereby the contact of the reed elements with the blanks effects a stripping of the scrap portions.

2. Apparatus for stripping die cut scrap portions including selvage edges from paperboard blanks comprising spaced parallel first and second sets of nip rolls, means for driving said sets of nip rolls in rotation with said second set being driven at a higher speed than said first set such that the passage of blanks between said sets of nip rolls with the selvage edges parallel to said rolls effects a tensioning of the blanks and a stripping of the selvage edges, a plurality of closely spaced parallel reed elements, means for oscillating said reed elements, and means for progressively advancing the blanks to effect intermittent contact with the reed elements at closely spaced intervals thereon whereby the contact of the reed elements with the blanks effects a stripping of the scrap portions.

3. Apparatus for stripping scrap portions from die cut blanks comprising a frame, means for advancing blanks across said frame, a plurality of closely spaced parallel reed elements on said frame, said reed elements extending across the path of travel of the blanks, and means for oscillating said reed elements to effect intermittent contact thereof with the advancing blanks at closely spaced intervals thereon, whereby the contact of the reed elements with the blanks effects a stripping of the scrap portions.

4. Apparatus for stripping scrap portions from die cut blanks comprising a frame, means for advancing blanks across said frame, said means comprising a plurality of spaced, parallel feed rolls and means for driving said feed rolls, a plurality of closely spaced, parallel reed elements on said frame, said reed elements extending across the path of travel of the blanks, and means for oscillating said reed elements to effect intermittent contact thereof with the advancing blanks at closely spaced intervals thereon, said latter means comprising a reed shaft to which said reeds are secured, and means for rotationally oscillating said reed shaft, whereby the contact of the reed elements with the blanks effects a stripping of the scrap portions.

5. The apparatus as claimed in claim 4 including means for stripping the front and rear selvage edges from the blanks comprising spaced parallel first and second sets of nip rolls, and means for driving said sets of nip rolls in rotation with said second set being driven at a higher speed than said first set such that the passage of blanks between said sets of nip rolls with the front and rear selvage edges parallel to said rolls effects a tensioning of the blanks and a stripping of the selvage edges.

6. The apparatus as claimed in claim 5 wherein said first and second sets of nip rolls are parallel to and aligned with said feed rolls with said nip rolls being positioned on said frame such that said blanks first pass through said nip rolls, said feed rolls being driven at the same speed as said second set of nip rolls.

7. Apparatus for stripping scrap portions from die cut blanks comprising a frame, means for advancing blanks across said frame, said means comprising a plurality of spaced, parallel feed rolls, means for driving said feed rolls, and idler rolls for maintaining frictional engagement of said blanks with said feed rolls, a reed shaft spaced from and extending across the path of travel of the blanks, a plurality of closely spaced, parallel reed elements extending from said reed shaft with one end of each said reed element secured to said reed shaft, means for rotationally oscillating said reed shaft to effect oscillation of said reed elements and intermittent contact of the free ends of said reed elements with the advancing blanks at closely spaced intervals thereon, whereby the contact of the reed elements with the blanks effects a stripping of the scrap portions.

8. The apparatus as claimed in claim 7 including means for stripping the front and rear selvage edges from the blanks comprising spaced parallel first and second sets of nip rolls, and means for driving said sets of nip rolls in rotation with said second set being driven at a higher speed than said first set such that the passage of blanks between said sets of nip rolls with the front and rear selvage edges parallel to said rolls effects a tensioning of the blanks and stripping of the selvage edges.

9. Apparatus as claimed in claim 7 including a plurality of runner assemblies extending longitudinally between said feed rolls for supporting the blanks during contact with said reed elements.

10. Apparatus as claimed in claim 9 including means for adjusting the transverse position of each of said runner assemblies to facilitate displacement of scrap portions from the blanks passing thereover.

11. Apparatus as claimed in claim 7 including means for controlling the speed of said feed rolls and means for varying the frequency of oscillation of said reed shaft and reed elements whereby the spacing of the intervals between reed contact with the blanks may be regulated.

12. The apparatus as claimed in claim 7 wherein said idler rolls are journaled on said frame directly above said feed rolls, and means permitting free vertical slidable movement of said idler rolls whereby the weight of said idler rolls maintains frictional engagement of said blanks with said feed rolls.

13. Apparatus as claimed in claim 7 including a plurality of reed shafts having reed elements extending therefrom, and means varying the angular oscillating relationship of said reed shafts to provide an equal spacing of the reed contacts with the blanks.

14. Apparatus as claimed in claim 7 wherein each said reed element comprises a longitudinally extending thin sectioned flexible element.

15. Apparatus as claimed in claim 14 wherein each said reed element is formed of a self-lubricating synthetic material.

16. Apparatus as claimed in claim 14 wherein each said reed element is formed of nylon.

17. Apparatus for stripping scrap portions from die cut blanks comprising a frame, infeed conveyor means at one end of said frame, discharge conveyor means at the opposed end of said frame, and a central stripping region intermediate said infeed and discharge conveyor means, a first set of nip rolls in said central stripping region adjacent said infeed conveyor, means for driving said first set of nip rolls, a second set of nip rolls in spaced parallel relation with said first set of nip rolls, means for driving said second set of nip rolls at a higher speed than said first set such that the passage of blanks between said sets of nip rolls with the selvage edges parallel to said rolls effects a tensioning of the blanks and stripping of the selvage edges, a plurality of spaced parallel feed rolls in said central stripping region aligned with and parallel to said nip rolls, means for driving said feed rolls at the same speed as said second set of nip rolls, idler rolls in cooperative relation with said feed rolls for maintaining frictional engagement of the blanks with said feed rolls, a plurality of reed shafts in said stripping region spaced from and extending across the path of travel of the blanks, and a plurality of closely spaced, parallel reed elements extending from each said reed shaft with one end of each said reed element secured to one of said reed shafts, means for rotationally oscillating said reed shafts to effect oscillation of said reed elements and an intermittent contact of the free ends of said reed elements with the advancing blanks at closely spaced intervals thereon, whereby the contact of the reed elements with the blanks effects a stripping of the scrap portions.

18. Apparatus as claimed in claim 17 including means permitting an adjustable spring-loading of said first and second sets of nip rolls and providing an equal spring-loaded pressure to both sets of rolls.

19. Apparatus as claimed in claim 18 including means permitting selective disengagement of one of said sets of nip rolls without affecting the spring-loaded setting of the other set of nip rolls.

20. Apparatus as claimed in claim 17 including a plurality of runner assemblies extending longitudinally between said feed rolls for supporting the blanks during contact with said reed elements.

21. Apparatus as claimed in claim 20 including means for adjusting the transverse position of each said runner assembly to facilitate displacement of scrap portions from the blanks passing thereover.

References Cited

UNITED STATES PATENTS

| | | | |
|---|---|---|---|
| 799,624 | 9/1905 | Beck et al. | 83—103 |
| 2,513,093 | 6/1950 | Hageman | 225—100 |
| 2,655,842 | 10/1953 | Baumgartner | 225—100 X |
| 2,800,180 | 7/1957 | Jensen | 225—100 X |
| 3,019,824 | 2/1962 | Bakke | 83—103 X |
| 3,184,129 | 5/1965 | Knecht | 225—97 X |

WILLIAM W. DYER, JR., *Primary Examiner.*

J. M. MEISTER, *Assistant Examiner.*